Patented Apr. 23, 1929.

1,710,446

UNITED STATES PATENT OFFICE.

VERE B. BROWNE, OF BRACKENRIDGE, PENNSYLVANIA.

PROCESS OF PREPARING LOW-CARBON ALLOYS.

No Drawing.   Application filed October 21, 1925. Serial No. 64,016.

This invention relates to the preparation of low-carbon ferro-alloys in the electric furnace; and comprises, in its preferred embodiment, a process whereby alloys of chromium, tungsten, manganese and other metals characterized by a high degree of affinity for carbon, may be readily prepared in the electric arc furnace, from a charge of which the metal content consists wholly or in substantial proportion of low-carbon scrap. In the remelting of low-carbon scrap in the electric arc furnace it has heretofore been considered impracticable to prevent the absorption of a certain amount of carbon from the arc, rendering it extremely difficult if not impossible to prepare in a furnace of this kind such low-carbon alloys as are typified for example by "rustless iron," of which the carbon content is required to be of the order of 0.1% or lower. The present process permits such manufacture to be carried out with ease and certainty. This process is a modification of that disclosed in my copending application, Serial No. 611,644, filed January 9, 1923.

According to the said prior application, such alloys may be prepared by refining a metal bath by means of oxidizing slags in accordance with the usual practice for obtaining such bath of the desired low carbon content; then replacing the impure oxidizing slag by a basic slag containing a reducible metal oxid in proportion at least sufficient to oxidize the carbon vapors emanating from the arc; and introducing the alloying metal or metals in presence of this slag. Suitable reducible oxids for imparting an oxidizing character to this secondary slag are oxids of iron, chromium and manganese.

I have now found that by an appropriate modification of this procedure low-carbon ferro-alloys, and in particular rustless iron, can be directly prepared by the remelting of scrap of the same approximate composition or even of somewhat higher carbon content in the arc furnace. I prefer to proceed as follows, it being understood that my invention is not limited to the particular materials, proportions and manipulations described by way of example:

Iron-chromium alloy scrap, containing for example about 12–14% chromium, with 0.1–0.2% carbon, is charged into the electric arc furnace with manganese dioxid (manganese ore) and lime; suitable proportions being for example:

|   | Pounds. |
|---|---|
| Iron-chromium scrap | 12,000 |
| Manganese ore | 100 |
| Lime | 400 |

This charge is melted down in the usual manner, forming an alloy bath overlaid by a strongly oxidizing basic slag. This slag contains a considerable excess of manganese oxid, and a large part of it is tapped off and discarded at this point and the remaining slag enriched with lime. Thereupon the power is cut off and the electrodes are raised sufficiently to prevent contact with or contamination of the bath, and the bath reduced by the addition of appropriate non-carbonaceous reducing agents such as silicon, ferrosilicon, aluminum or the like.

The above procedure has been found to involve no appreciable loss of chromium through oxidation, and no substantial increase in the carbon content of the metal: in fact this carbon content is as a rule appreciably diminished, especially when the initial carbon content is above about 0.12%. Furthermore, the operating conditions are excellent owing to the high fluidity of the slag.

In the practice of the invention described in my copending application above mentioned, wherein the alloying additions are introduced in presence of an oxidizing slag, oxids of chromium, iron and manganese have all been found serviceable to impart the necessary oxidizing character to the slag. In the present instance, however, oxids of chromium or of iron do not nearly as well serve the purposes of the invention, while manganese oxid is eminently satisfactory. The use of iron oxid, (mill-scale) gives a high-melting slag and entails considerable losses of chromium; whereas chromium ore has proven less effective in preventing absorption of carbon, also yielding high-melting slags. Hence my present invention, in its preferred embodiment, is confined to the employment of oxids or oxid compounds of manganese, typified by manganese ore, although not limited thereto.

It will of course be understood that the composition of the alloys, as prepared in accordance with this invention, may be modified as desired by the introduction of alloying additions in presence of the oxidizing slag, as described in my copending application above mentioned, or in any other desired manner.

I claim:

1. Process of preparing rustless iron comprising melting in a carbon arc furnace a charge containing a low-carbon iron-chromium alloy, lime, and manganese oxid, proportioned to yield a basic oxidizing slag capable of preventing substantial accession of carbon to the bath.

2. Process of preparaing rustless iron comprising melting in a carbon arc furnace a charge containing an iron-chromium alloy containing upward of about 0.12 percent carbon, lime, and manganese oxid, said charge proportioned to yield a basic oxidizing slag capable of preventing accession of carbon to the bath and of eliminating a portion of the carbon from said alloy.

In testimony whereof, I affix my signature.

VERE B. BROWNE.